United States Patent

Krimmer et al.

(10) Patent No.: US 6,651,951 B2
(45) Date of Patent: Nov. 25, 2003

(54) MAGNETIC VALVE

(75) Inventors: Erwin Krimmer, Pluederhausen (DE); Wolfgang Schulz, Bietigheim-Bissingen (DE); Achim Meisiek, Rudersberg (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/275,606

(22) PCT Filed: Mar. 15, 2002

(86) PCT No.: PCT/DE02/00956
§ 371 (c)(1), (2), (4) Date: Nov. 7, 2002

(87) PCT Pub. No.: WO02/075143
PCT Pub. Date: Sep. 26, 2002

(65) Prior Publication Data
US 2003/0102446 A1 Jun. 5, 2003

(30) Foreign Application Priority Data
Mar. 16, 2001 (DE) .......................... 101 12 661

(51) Int. Cl.$^7$ ................. F02M 25/08; F16K 31/06
(52) U.S. Cl. ............. 251/64; 123/568.21; 251/129.15
(58) Field of Search ........ 251/48–64, 129.15–129.22; 123/568.11–568.32

(56) References Cited

U.S. PATENT DOCUMENTS

| 5,370,355 A | * | 12/1994 | Rembold et al. | 251/64 |
| 5,423,602 A | * | 6/1995 | Takahashi | 251/129.19 |
| 5,762,097 A | * | 6/1998 | Hettinger et al. | 251/129.15 |
| 5,878,991 A | | 3/1999 | Krimmer et al. | |
| 6,058,913 A | | 5/2000 | Busato | |
| 6,119,725 A | * | 9/2000 | Shinobu et al. | 251/129.15 |
| 6,321,725 B1 | * | 11/2001 | Krimmer et al. | 251/129.16 |

FOREIGN PATENT DOCUMENTS

DE  199 01 090 A  7/2000

OTHER PUBLICATIONS

Borsch–Technische Unterrichtung Motormanagement Motonic:, Second Edition, Aug. 1993, pp. 48–49.

* cited by examiner

Primary Examiner—Paul J. Hirsch
(74) Attorney, Agent, or Firm—Michael J. Striker

(57) ABSTRACT

A magnet valve according to the related art has a sealing and damping device with an elastic region on which, during operation, a force acts due to different existing pressures that must also be overcome when the armature plate is moved. A magnet valve (1) designed according to the invention has a sealing and damping device (46) with an elastic region (105) that is oriented and designed in relation to a seal seat (103) in such a fashion that the above-described force is offset. As a result, a better characteristic curve of the magnet valve (1) over the existing differential pressure is obtained.

3 Claims, 3 Drawing Sheets

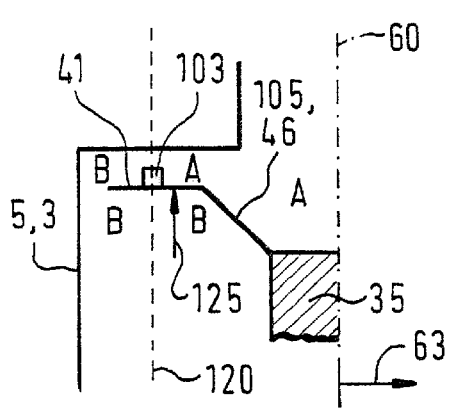
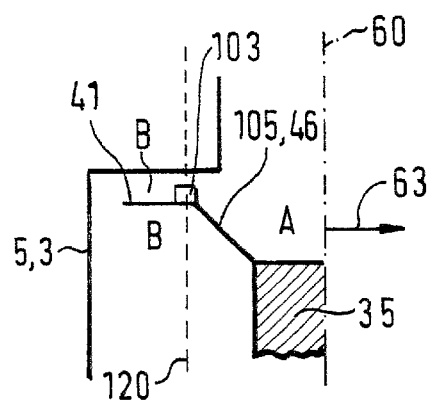
Fig. 3a | Fig. 3b
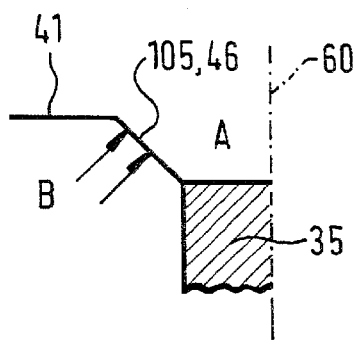
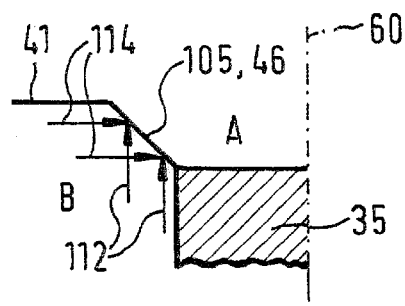
Fig. 4a | Fig. 4b
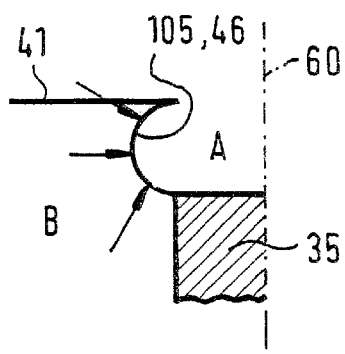
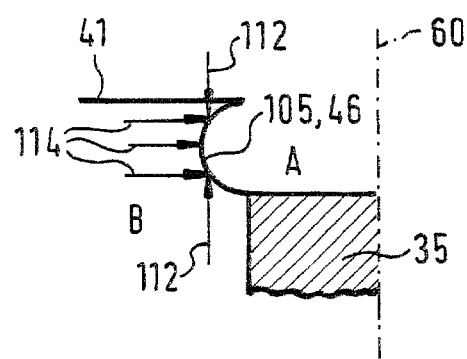
Fig. 4c | Fig. 4d

MAGNETIC VALVE

BACKGROUND OF THE INVENTION

The invention is based on a magnet valve according to the general class of claim 1.

A magnet valve is made known in DE 199 01 090 A1 that has a sealing and damping device with an elastic region that, due to the adjacent vacuum, exerts a force against the direction of the closing valve during operation. This increases the force required to open the valve.

ADVANTAGES OF THE INVENTION

In contrast, the magnet valve according to the invention having the characterizing features of claim 1 has the advantage that a force produced by the existing pressure differential in the valve and that acts on the elastic region of a sealing and damping device is offset in simple fashion. This results in a better characteristic curve of the flow over the existing pressure differential.

Advantageous further developments and improvements of the magnet valve named in claim 1 are made possible by means of the measures listed in the dependent claims.

It is particularly advantageous when the elastic region of the sealing and damping device is designed in the shape of a semi-arc or a semicircle.

SUMMARY OF THE DRAWINGS

Exemplary embodiments of the invention are presented in simplified form in the drawings and they are described in greater detail in the subsequent description.

FIG. 3a shows a valve device with a sealing and damping device according to the related art. FIG. 3b shows a valve device with a sealing and damping device of a magnet valve according to the invention, and FIG. 4a and FIG. 4b show the forces acting on a sealing and damping device.

FIGS. 4c and 4d show forces acting on the sealing and damping device according to an embodiment of the invention.

DESCRIPTION OF THE PREFERRED EMBODIMENTS

Figure 1:
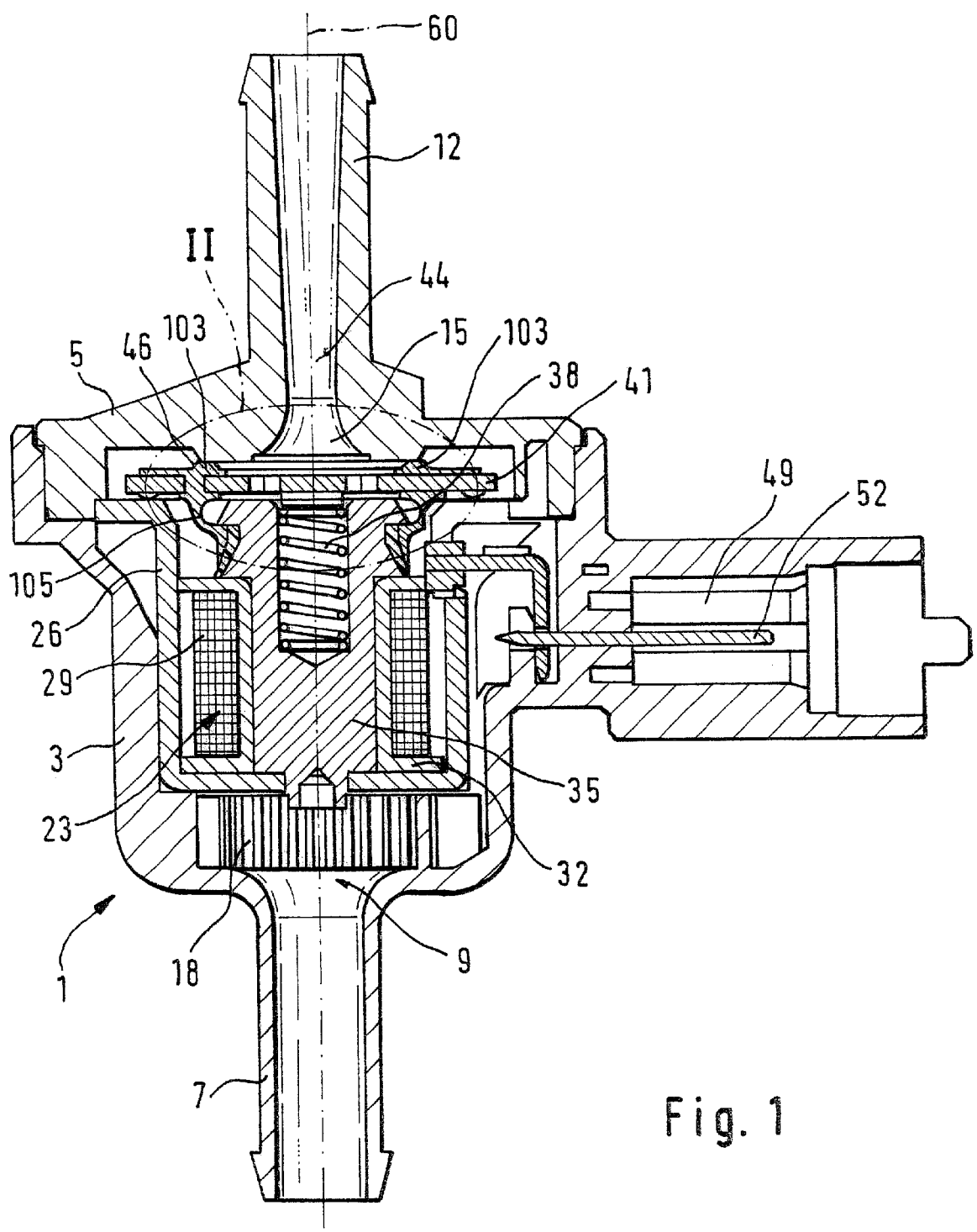
FIG. 1 shows a magnet valve according to the invention.

A tank ventilation valve shown in a longitudinal sectional drawing in FIG. 1 as an exemplary embodiment of a magnet valve 1 is used for the metered addition of volatilized fuel from a fuel tank of a (not shown) mixture-compressed internal combustion engine with externally-supplied ignition into the internal combustion engine, e.g., into an intake manifold or, in the case of gasoline direct injection, directly into a cylinder of the internal combustion engine, and it is part of a not further shown evaporative-emissions control system of an internal combustion engine. The design and function of evaporative-emissions controls systems of this type are described in the "Bosch-Technische Unterrichtung Motormanagement Motronic", Ed. 2, August 1993, pages 48 and 49, for example. A tank ventilation valve and its function are also described, for example, in DE 199 01 090 A1, which is expressly intended to be part of this disclosure.

The tank ventilation valve 1 has a plurality of housing parts, e.g., a double-component housing with a first housing part 3 that is designed in the shape of a cup, for example, and a housing part 5 that seals said first housing part and is designed in the shape of a cap, for example. The housing part 3 has an intake 7 for connection to a vent connection of the fuel tank, or to a tank for the volatilized fuel filled with activated carbon installed downstream from said fuel tank. The intake 7 has an intake opening 9 located in the region of a base 55 of the housing part 3.

The housing part 5 has an outlet 12 for connection to the intake manifold of the internal combustion engine. The outlet 12 has an exhaust-valve opening 15 or a valve opening 15. The intake 7 and the outlet 12 are mounted on the housing parts 3, 5, respectively, along an axial direction 60, for example.

An electromagnet 23 is located inside the cup-shaped housing part 3. The electromagnet 23 has a magnet housing 26 designed in the shape of a cup, for example, with a cylindrical magnet core 35 that is situated coaxial to the valve axis and penetrates the base of the cup, and with a cylindrical field coil 29 seated on a coil holder 32 that surrounds the magnet core 35 in the magnet housing 26. Located on its side facing the outlet 12 is an armature plate 41 that can be moved against the return force of a return spring 38, which said armature plate is attracted by the electric magnet 23 and forms a valve device that comes to bear against a seal seat located directly or indirectly against the housing part 5. The outlet 12 has a flow element 44 in the form of a convergent-divergent nozzle. It is understood, however, that the flow element 44 is not limited to a convergent-divergent nozzle and can also be developed as an orifice or a constriction. The flow element 44 is designed so that the surface of its narrowest flow cross-section is smaller than the surface of the opening cross-section of the seal seat 103. Furthermore, a sealing and damping device 46 is located on the armature plate 41 forming a valve device. The sealing and damping device 46 is located on the armature plate 41 and the magnet core 35 and interconnects them as an elastic element.

The housing 3, 5 has a connector 49, for example, that is integral with the housing 3, 5 and has electrical end fittings 52 for connection to external plug contacts.

A filter 18, for example, is located in the housing part 3 in the vicinity of the intake opening 9.

The medium that can contain particles from the carbon filter, for example, flows through the intake opening 9 through the filter 18, which retains these particles, past the magnet housing 26 in the direction toward the outlet 12.

Figure 2:
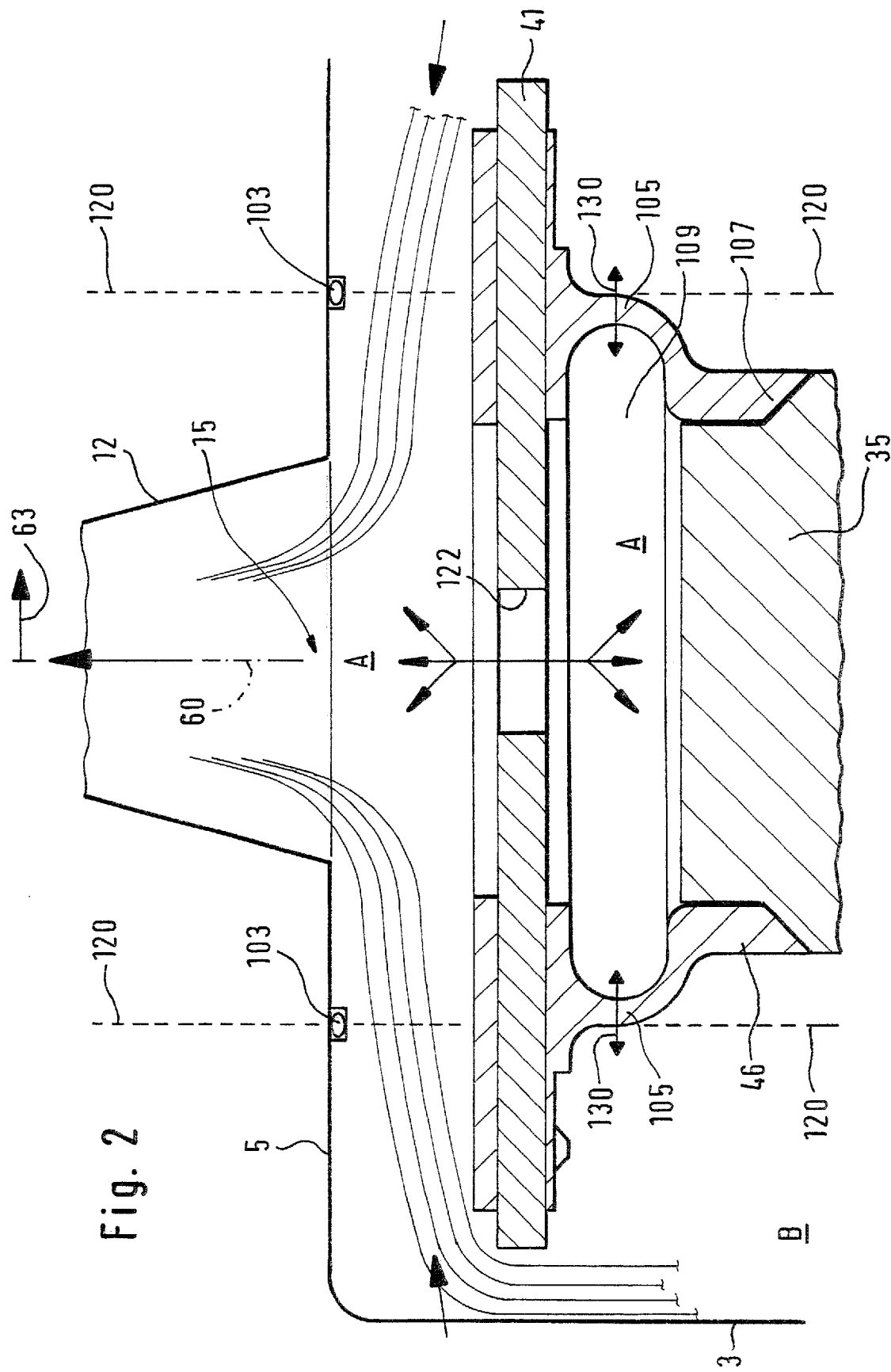
FIG. 2 shows an enlarged representation of a sealing and damping device of the magnet valve designed according to the invention.

FIG. 2 shows an enlarged representation of a sealing and damping device 46 of a magnet valve 1—developed according to the invention—according to the region labelled "II" in FIG. 1.

The sealing and damping device 46 forms the seal seat 103 when it bears against the second housing part 5.

When the sealing and damping device 46 seals the outlet 12, a vacuum exists in the region labelled "A" in the outlet 12 during operation of the internal combustion engine, which said vacuum also acts via a pressure-equalization opening 122 in the armature plate 41 in a hollow space 109 between the armature plate 41, the magnet core 35 and an elastic region 105 of the sealing and damping device 46. Region A basically includes the region between the valve device 41 and the outlet 12, bordered by the seal seat 103. A region labelled "B" abuts region A outside the seal seat 103 and surrounds a region between the valve device 41 and the intake 7. A higher pressure exists here than in region A, e.g., a gas pressure of the fuel or ambient pressure.

Between the valve device 41 and the magnet core 35, the sealing and damping device 46 has the elastic region 105 and an end region 107 that extends into a recess of the magnet core 35 designed complementary in shape to said end region, and which is fastened to the magnet core 35. The sealing and damping device 46 extends radially around the axial direction 60.

When the armature plate 41 moves, the axial motion of the elastic region 105 ensures that the hollow space 109 closest to the magnet core 35 is sealed off from the environment. By means of the pressure-equalization opening 122 and the sealing and damping device 46, it is ensured that the hollow space 109 on the side closest to the magnet core is interconnected with the hollow space 109 on the side closest to the seal seat and is therefore interconnected, pressure-equalized, with the outlet 12. Due to this pressure equalization, when the armature plate 41 is attracted by the electromagnet 23, the only force to be overcome is the return force of the return spring 38, and, possibly, a minimal compressive force acting on a part of the seal element 46, but not the force of a differential pressure that would occur between the side of the hollow space 109 closest to the electromagnet and the side of the hollow space 109 closest to the valve seat and that would act on both sides of the armature plate 41 if a compensating orifice 122 were not present.

The axial cross-section of the elastic region 105 is designed in the shape of an arc or, as shown in FIG. 2, in the shape of a circle.

It is important that the seal seat 103 is situated in the axial direction 60 on a line 120 with an external or internal—i.e, external expansion minus the wall thickness of the elastic region 105—radial expansion of the elastic region 105 (FIG. 3b). The seal seat 103 is not necessarily a sharply defined line. Instead, it can have a certain width, i.e., the position of the line 120 is not sharply defined. The line 120 can extend in the radial direction 63 through an outer or inner edge of the valve seat 103 and through an outer or inner edge of the elastic region 105. Moreover, it is also possible to shift the line 120 slightly. This is indicated by an arrow 130 in the radial direction 63 in FIG. 2.

FIG. 3a shows a valve device 41 having a sealing and damping device 46, and it shows its arrangement in relation to the seal seat 103 according to the related art.

Viewed in the radial direction 63, at a right angle to the axial direction 60, the seal seat 103 lies on a line 120 in the axial direction 60 outside a radial expansion of the elastic region 105.

The letters A and B indicate the vacuum and the high-pressure region, respectively.

Viewed in the radial direction 63, outside the seal seat 103, the same pressure acts on the valve device 41 from above and below as viewed in the axial direction 60. This pressure is labelled "B".

Between the seal seat 103 and the radial expansion of the elastic region 105, the vacuum A acts on the one side of the valve device 41, and the higher pressure B acts on the other side. This results in an additional force 125 in the direction of closing, indicated by an arrow, which must also be applied by the electromagnet 23 during opening.

FIG. 3b shows a magnet valve designed according to the invention in which the seal seat 103 and the radial expansion of the elastic region 105 are oriented toward each other, i.e., they lie on a line 120. As in FIG. 3a, the same forces act outside the seal seat 103—as viewed in the radial direction 63—due to the pressure B that exists there. Due to this arrangement, the region between the seal seat 103 and the elastic region 105 is eliminated, so that the force 125 does not occur.

In this case, a force only acts on the elastic region 105, caused by the pressure in region B and/or A.

FIG. 4a and FIG. 4b show which forces act on the elastic region 105, whereby the seal seat 103 and a radial expansion of the elastic region 105 are arranged according to FIG. 3b.

The elastic region 105 and the axial direction 60 form an angle of intersection that is between >0° and <90°. Due to the different pressures in regions A and B, the force is situated at a right angle on a surface of the elastic region 105. FIG. 4b shows a splitting of this force according to FIG. 4a into axial forces 112 and radial forces 114, each of which is indicated by arrows. The axial forces 112 act like force 125 in FIG. 3a.

FIG. 4c shows a further exemplary embodiment of a magnet valve 1 designed according to the invention. In this example, the sealing and damping device 46 is designed in the shape of an arc or a circle in its elastic region 105. Due to the different pressures in regions A and B, forces labelled with arrows act on the elastic region 105.

FIG. 4d shows once more the splitting of these forces according to FIG. 4c into axial forces 112 and radial forces 114.

Due to this embodiment of the elastic region 105, the axial forces 112 cancel each other out, because they oppose each other; as a result, this force—which is still present according to FIG. 4b—must no longer be applied by the magnet 23 when the magnet valve is opened.

This has advantages for the ability to manufacture the sealing and damping device 46 and results in better pressure equalization, which, in turn, results in a better characteristic curve over the existing differential pressure.

What is claimed is:

1. A magnet valve, in particular for tank ventilation in motor vehicles, having at least one valve opening formed on a seal seat, having a valve element for opening and closing the at least one valve opening, that cooperates with the seal seat, and is actuated by an electromagnet against the return force of a return spring, having a magnet core of an electromagnet, having a sealing and damping device located on the valve device and the magnet core that interconnects the valve device and the magnet core, and that has an elastic region between the valve device and the magnet core, wherein the seal seat (103) is located approximately on a line (120) in the axial direction (60) with a radial expansion of the elastic region (105).

2. The magnet valve according to claim 1, wherein the axial cross-section of the elastic region (105) is designed in the shape of a circle.

3. The magnet valve according to claim 1, wherein the axial cross-section of the elastic region (105) is designed in the shape of an arc.

* * * * *